United States Patent [19]
Fisk

[11] Patent Number: 5,612,006
[45] Date of Patent: Mar. 18, 1997

[54] CATALYTIC CONVERTER AND PHASE-SPREADING SPIRAL MUFFLER ASSEMBLY

[76] Inventor: James C. Fisk, 26 S. Oak Forest Dr., Asheville, N.C. 28803

[21] Appl. No.: 498,045

[22] Filed: Jul. 5, 1995

[51] Int. Cl.$^6$ .............................. B01D 50/00; F01N 3/10
[52] U.S. Cl. .................... 422/171; 422/172; 422/176; 422/177; 60/299; 60/304; 60/305; 60/322; 55/309; 55/338; 55/DIG. 30
[58] Field of Search ................................. 422/172, 171, 422/176, 177; 60/299, 302, 304, 305, 312, 322, 323, 324; 55/309, 338, DIG. 30

[56] References Cited

U.S. PATENT DOCUMENTS

| Re. 25,576 | 5/1964 | Cornelius | 60/283 |
|---|---|---|---|
| 1,658,126 | 2/1928 | Jehle | 60/283 |
| 2,851,852 | 9/1958 | Cornelius | 60/283 |
| 2,908,344 | 10/1959 | Maruo | 60/283 |
| 3,050,376 | 8/1962 | Bishop et al. | 60/283 X |
| 3,062,317 | 11/1962 | Pigman | 60/283 |
| 3,066,755 | 12/1962 | Diehl | 60/283 |
| 3,083,525 | 4/1963 | Morris | 60/283 |
| 3,209,531 | 10/1965 | Morris et al. | 60/283 X |
| 3,263,412 | 8/1966 | Thompson | 60/283 |
| 3,306,034 | 2/1967 | Boyd | 60/283 X |
| 3,692,142 | 9/1972 | Stemp | 60/308 |
| 3,815,337 | 6/1974 | Lenane | 55/276 |
| 3,911,675 | 10/1975 | Mondt | 60/283 |
| 3,921,396 | 11/1975 | Nohira | 60/290 |
| 4,094,648 | 6/1978 | Bailey | 422/168 |
| 4,126,205 | 11/1978 | Bauerschmidt | 422/168 |
| 4,204,586 | 5/1980 | Hani et al. | 181/280 X |
| 4,231,763 | 11/1980 | Baisden | 55/1 |
| 4,317,502 | 3/1982 | Harris et al. | 60/300 |
| 4,480,595 | 11/1984 | Hobby et al. | 422/168 |
| 4,579,195 | 5/1987 | Nieri | 181/280 X |
| 4,667,769 | 5/1987 | Appel | 181/280 X |
| 4,751,980 | 6/1988 | DeVane | 181/280 X |

Primary Examiner—Nina Bhat
Attorney, Agent, or Firm—Carter & Schnedler, P.A.

[57] ABSTRACT

An assembly combining a catalytic converter with a spiral muffler, particularly for small internal combustion engines. In series are an expansion chamber, a venturi for air injection, a catalytic converter, and a phase-spreading spiral muffler. The expansion chamber promotes proper operation of the venturi, as well as reducing engine exhaust back pressure and providing some noise reduction. The muffler has a spirally coiled exhaust channel dead-ended at its inner extremity, with an outer extremity serving as a muffled exhaust outlet. A distribution chamber is adjacent the spiral exhaust channel, sharing a common wall therewith, and a plurality of streamlined slotted openings spaced along the exhaust channel at different distances from the muffled exhaust outlet introduce gas from the distribution chamber into the spiral channel. Disclosed is a space efficient construction including a series-connected venturi and catalytic converter assembly mounted centrally and coaxially within a cylindrical expansion chamber, with elements of the muffler arranged coaxially around a projecting portion of the catalytic converter.

16 Claims, 11 Drawing Sheets

CATALYTIC CONVERTER AND PHASE-SPREADING SPIRAL MUFFLER ASSEMBLY

BACKGROUND OF THE INVENTION

The present invention relates generally to devices combining a catalytic converter with a muffler in a space-efficient and functionally-effective manner, particularly for small internal combustion engines. While the devices as disclosed herein are particularly suitable for small internal combustion engines ranging from approximately two horsepower to twenty horsepower, the invention may be applied to engines of smaller or larger sizes as well.

Nearly every small internal combustion engine includes a muffler, and a wide variety of muffler designs have been proposed and employed in the prior art. Relevant in the particular context of the present invention are various muffler designs including spiral channels. Spiral channel mufflers advantageously provide a relatively long channel length in a relatively compact space, and have the potential for highly effective noise reduction.

Thus, and as an example, in the case of an internal combustion engine operating under load at, for example, 3000 R.P.M., the exhaust valve opens very quickly to release a surge of exhaust gas which is under substantial residual pressure. For example, the pressure of an exhaust gas surge may be as high as 2.7 atmospheres. In the exemplary case of a twelve horsepower engine, the release could be in excess of sixty cubic inches of atmospheric pressure gas. It is quite common knowledge that, if not muffled, such sudden releases of pressure produce considerable objectionable noises or compressional sound waves at various frequency components. In the case of a four-stroke cycle engine, the exhaust gas surges are produced once every other revolution. Thus, in the example of a four-stroke cycle engine operating at 3000 R.P.M., or fifty revolutions per second, twenty-five exhaust gas surges are produced per second.

In addition to objectionable noise, exhaust gas from an internal combustion engine generally includes a variety of constituents that are considered to be pollutants. Such exhaust gas constituents include unburned hydrocarbons and carbon monoxide (CO). Engine exhaust gas is typically treated by means of a catalytic converter which promotes more complete oxidation of the exhaust gas constituents, changing unburned hydrocarbons to carbon dioxide ($CO_2$) and water, and changing carbon monoxide (CO) to carbon dioxide ($CO_2$).

In order for such oxidation to effectively occur, in most cases it is necessary to introduce atmospheric air containing oxygen into the exhaust gas stream upstream of the catalytic converter. A variety of devices have been proposed and employed in the prior art for introducing atmospheric air into the exhaust gas stream upstream of a catalytic converter, including air pumps to inject air at positive pressure at a suitable point in the exhaust gas stream, and venturis arranged to draw in atmospheric air through an air nozzle. As is known, a venturi has a throat of reduced cross sectional area which forces an increase in velocity and a consequent drop in pressure.

From the standpoint of cost as a consideration, the venturi approach is preferable to employing an air pump. Thus, a venturi arrangement is generally less expensive to manufacture at the outset, and is generally not subject to periodic maintenance as there are no moving parts.

A problem, however, in the use of venturis is that it is difficult to maintain proper venturi operation with an input gas flow in the form of periodic surges or slugs of gas. If not otherwise prevented, typically as the surge pressure gas plug passes through, it causes backflow of exhaust gas through the intended atmospheric air intake.

More particularly, gas movement in time involves three main factors: difference in pressure between points of interest in a gas flow system, cross-sectional area of a gas flow channel, and kinetic energy of gas flow, including inertia involving density and velocity, whereby gas flow has a forceful tendency to continue velocity and direction. Friction and viscosity are inhibiting factors of gas motion.

When an engine is operating at high performance and its exhaust valve quickly opens, a slug of gas under quite high residual cylinder pressure starts accelerating down an exhaust system. Due to slug inertia, in addition to that of older gas remaining downstream in the exhaust system, some of the elevated pressure survives for quite a distance downstream.

In fact, this elevated pressure can exceed the drop in pressure in the venturi throat. Thus, as a result of exhaust pressure in the venturi throat exceeding atmospheric pressure, there is backflow through the nozzle which is supposed to be admitting air, such that exhaust gas puffs out, rather than in.

Moreover, under such conditions, not only does gas flow objectionably puff out through the intended atmospheric air inlets, but insufficient air is mixed with exhaust gas flow for proper operation of the catalytic converter.

One prior art approach to this problem is to employ a check valve which, being an additional and a moving part, introduces added initial cost and is subject to subsequent failure necessitating repair or replacement.

SUMMARY OF INVENTION

Accordingly, it is an object of the invention to provide an assembly including a catalytic converter for treating exhaust gas from an internal combustion engine which produces exhaust gas in periodic surges, including a venturi with no moving parts to draw in atmospheric air for oxygen enrichment upstream of the catalytic converter.

It is another object of the invention to provide an assembly which combines a catalytic converter with an effective muffler in a compact package for treating exhaust gas from an internal combustion engine which produces exhaust gas in periodic surges.

It is yet another object of the invention to provide an efficient muffler of the spiral channel type.

It is yet another object of the invention to provide an assembly which combines a catalytic converter and a spiral muffler in a functionally-effective manner and in a package which conserves space and has a simplified structure for cost-effective manufacture.

Very briefly, in accordance with one aspect of the invention it is recognized that air-injection venturi operation, when catalytically treating exhaust gas from an internal combustion engine which produces exhaust gas in periodic surges, is improved by providing an expansion chamber between the engine exhaust and the venturi. One effect of the expansion chamber is to sufficiently reduce the gas pressure surge from the engine when the exhaust valve opens and to time-spread the lowered pressure so as to provide a relatively more continuous flow of exhaust gas through the venturi. What are herein termed abrupt "surges" are accordingly reduced to what are herein termed "puffs", which have a lower amplitude The expansion chamber thus enables proper venturi operation. With an expansion chamber of sufficient size, gas pressure in the venturi throat is always below atmospheric pressure during operation.

The expansion chamber also serves a sound-reducing function, particularly with reference to the fundamental frequency of the periodic exhaust gas surges, by in effect mixing lead end pressure with the following low-pressure gas. Also, engine exhaust back pressure is reduced.

In accordance with a more particular aspect of the invention, a device for treating exhaust gas from an internal combustion engine which produces exhaust gas in periodic surges includes an exhaust gas inlet, an expansion chamber for reducing periodic exhaust gas surges, a venturi downstream of the expansion chamber for drawing in and mixing atmospheric air with exhaust gas, and a catalytic converter downstream of the venturi for oxidizing exhaust gas constituents. In typical embodiments, additionally there is a muffler downstream of the venturi. The muffler may be either upstream with reference to the catalytic converter, or downstream with reference to the catalytic converter.

The muffler more particularly is a phase-spreading muffler including a spirally coiled exhaust channel having an inner extremity, which is preferably dead-ended or closed, and an outer extremity, which serves as a muffled exhaust outlet. Adjacent the exhaust channel and sharing a common wall therewith is a distribution chamber. The distribution chamber has an inlet for receiving exhaust gas from the catalytic converter. Within the common wall are a plurality of openings spaced along the exhaust channel at different distances from the muffled exhaust outlet for introducing exhaust gas from the distribution chamber into the exhaust channel. The openings are all supplied by an exhaust puff almost simultaneously, producing a corresponding plurality of small puffs, which reach the muffled exhaust outlet at different times, resulting in phase-spreading.

Preferably, the openings are not simple apertures. Rather, the openings include contoured portions which project into the exhaust channel and which face in a downstream direction, towards the muffled gas outlet. The contoured portions are streamlined. In one embodiment, the openings take the form of apertures, such as semi-circular apertures, that are partially punched to leave an attached flap of material. The flaps have leading edges which face downstream and which thereby define downstream-facing slots.

In accordance with a more particular aspect of the invention, a device for treating exhaust gas from an internal combustion engine which produces exhaust gas in periodic surges includes a generally cylindrical expansion chamber having a pair of expansion chamber end walls, with an exhaust gas inlet in one of the expansion chamber end walls. In one form, the exhaust gas inlet is centered on one of the expansion chamber end walls.

Mounted centrally and coaxially within the expansion chamber is a series-connected venturi and catalytic converter assembly. The venturi has an inlet for receiving exhaust gas from within the expansion chamber, and the catalytic converter assembly projects through a central opening in the other of the expansion chamber end walls. Projecting into the venturi for drawing in atmospheric air for mixing with exhaust gas within and downstream of the venturi is an air nozzle.

Adjacent the other of the expansion chamber end walls is a phase-spreading spiral muffler. The muffler has an inlet for receiving exhaust gas from the catalytic converter. A portion of the catalytic converter extends beyond the other of the expansion chamber end walls. Advantageously, elements of the muffler are arranged generally coaxially about this extending portion of the catalytic converter, resulting in space-efficiency.

More particularly, in one embodiment the muffler includes a generally cylindrical distribution chamber having a closed distribution chamber outer end wall and a distribution chamber inner end wall which has an opening connected for receiving gas from the catalytic converter. Sandwiched between the expansion chamber and the distribution chamber is a spirally coiled exhaust channel which has an inner extremity and an outer extremity. The exhaust channel preferably is dead-ended or closed at the inner extremity, and the outer extremity defines a muffled exhaust outlet. The spirally coiled exhaust channel generally coaxially surrounds the extending portion of the catalytic converter. Thus, the exhaust channel shares the other of the expansion chamber end walls as one common wall, and shares the distribution chamber inner end wall as another common wall.

The common wall shared with the distribution chamber inner end wall has a plurality of openings spaced along the exhaust channel at different distances from the muffled exhaust outlet for introducing exhaust gas from the distribution chamber into the exhaust channel.

BRIEF DESCRIPTION OF THE DRAWINGS

While the novel features of the invention are set forth with particularity in the appended claims the invention, both as to organization and content, will be better understood and appreciated from the following detailed description taken in conjunction with the drawings, in which:

DETAILED DESCRIPTION

Figure 1:
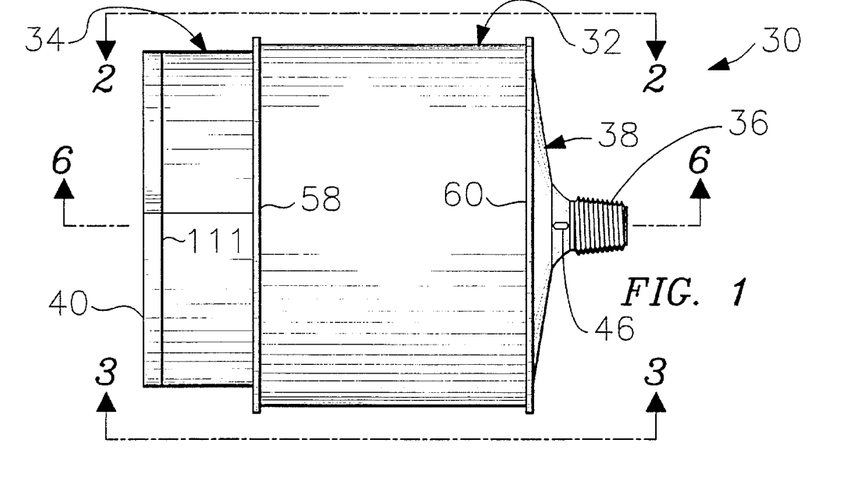
FIG. 1 is a top plan view of a catalytic converter and phase-spreading spiral muffler assembly in accordance with the invention.
Figure 2:
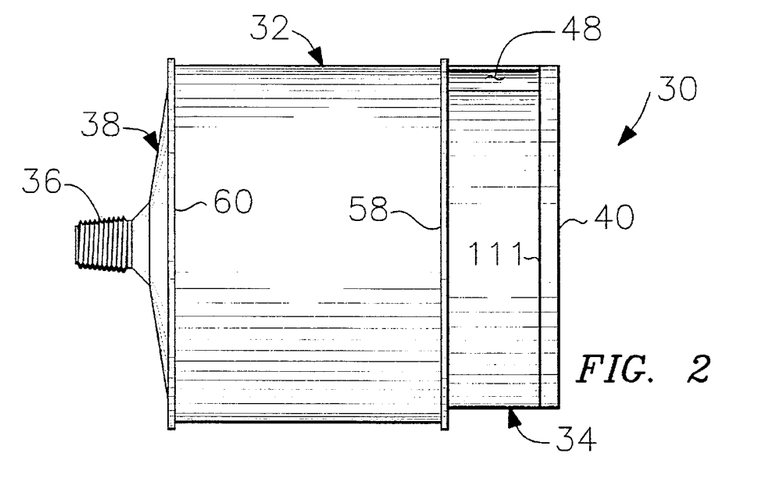
FIG. 2 is a side elevational view taken on line 2—2 of FIG. 1.
Figure 3:
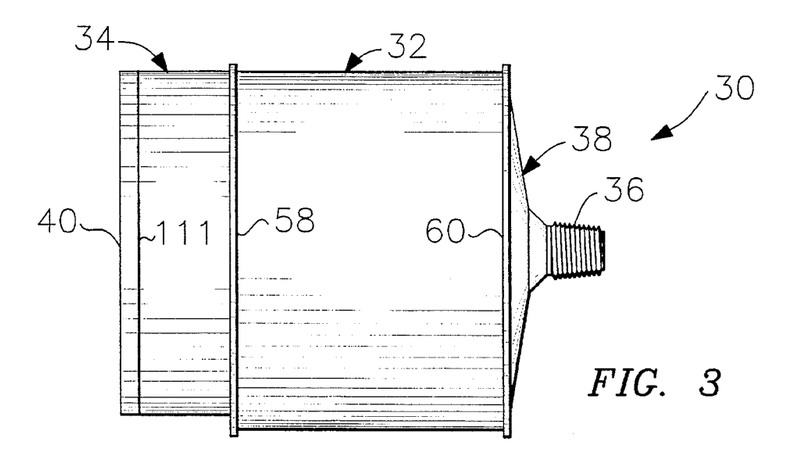
FIG. 3 is a side elevational view taken on line 3—3 of FIG. 1.

FIGS. 1–3 are exterior views of a catalytic converter and phase-spreading spiral muffler assembly 30 in accordance with the invention. While the actual orientation depends upon the particular installed mounting position which may vary as the assembly 30 is screwed on to an engine (not shown), for purposes of convenient description FIG. 1 is herein considered a top view, and FIGS. 2 and 3 are herein considered side elevational views, taken on lines 2—2 and 3—3 of FIG. 1, respectively.

The assembly 30 is generally cylindrical, and includes a cylindrical expansion chamber portion 32, and a spiral muffler portion 34, which is a somewhat distorted cylinder. By way of example and not limitation, for application to a twelve horsepower four-stroke cycle internal combustion engine, the catalytic converter and phase-spreading spiral muffler assembly 30 is approximately six-inches long, five and one-half inches in diameter, with a ¾ inch pipe thread on a connection piece 36.

By way of example, the assembly 30 has an axially-extending threaded connection piece 36 for connection to an exhaust port or exhaust manifold of an internal combustion engine, and the connection piece 36 is in turn affixed such as by welding to an inner end plate 38 of the assembly 30, preferably in the center of the inner end plate 38. While the illustrated connection piece 36 has a tapered pipe thread, such is for purposes of example only, as the connection piece 36 is made to suit the particular engine. Opposite the inner end plate 38 is a closed outer end plate 40 (best seen in FIGS. 6 and 15).

Figure 4:
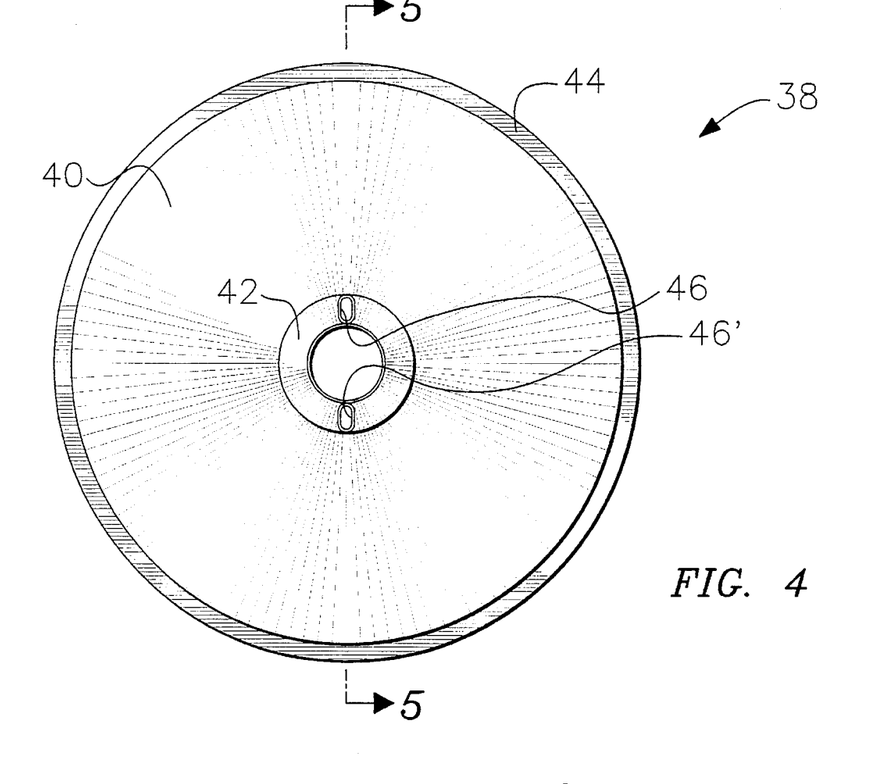
FIG. 4 is a front elevational view of the inner end plate of the assembly of FIGS. 1-3.
Figure 5:
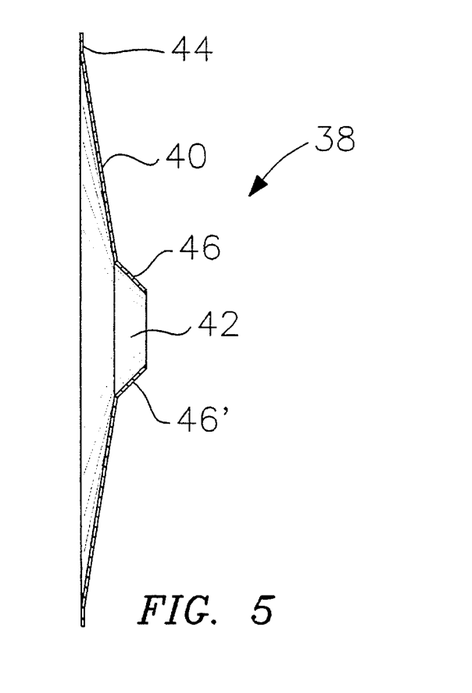
FIG. 5 is a side cross-section of the inner end plate taken on line 5—5 of FIG. 4.

Referring additionally to FIGS. 4 and 5, the inner end plate 38 more particularly is a stamped metal piece having two frustroconical portions, an outer frustroconical portion 40 with a relatively shallow angle, connected to an inner frustroconical portion 42, with a relatively steeper angle. For mounting purposes, a flat rim 44 surrounds the outer frustroconical portion 40. Formed in the inner frustroconical portion 42 of the end plate 38 are a pair of apertures 46 and 46' which serve as atmospheric air inlet ports for oxygen enrichment of the exhaust gas stream as is described hereinbelow. (Only one of these atmospheric air inlet apertures 46 is visible in the top view of FIG. 1.)

Figure 6:
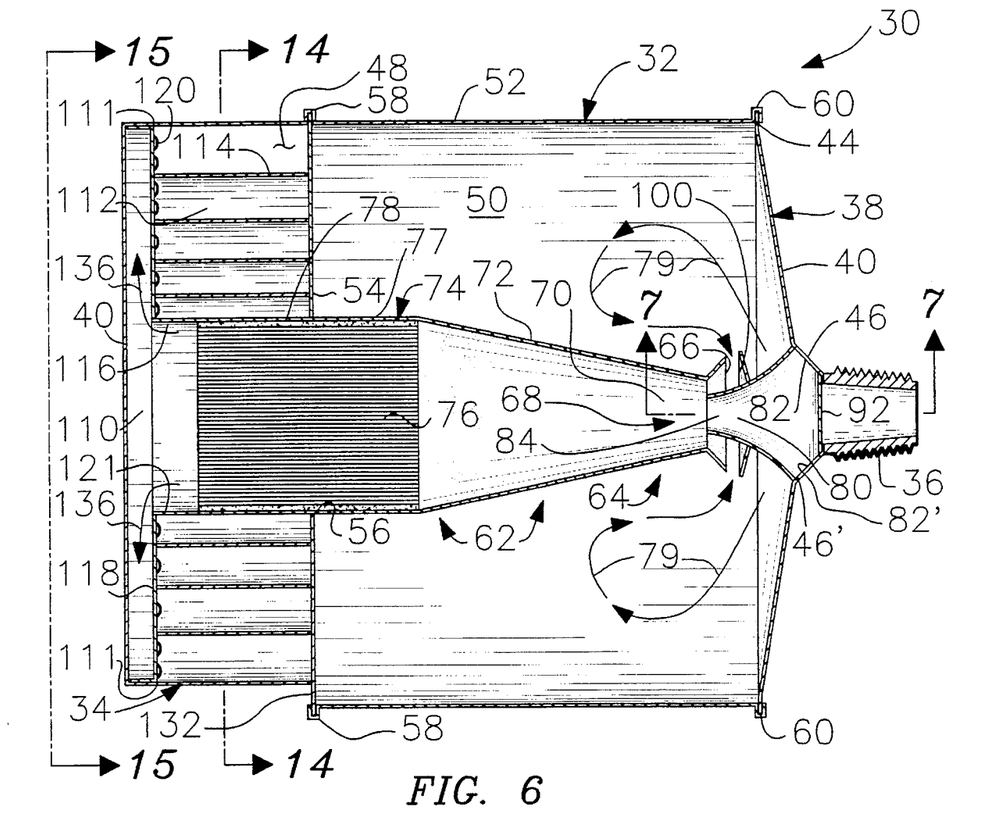
FIG. 6 is an enlarged cross-sectional view taken on line 6—6 of FIG. 1.

The assembly 30 additionally has a muffled exhaust outlet 48, best seen in FIG. 2, and not visible in FIGS. 1 and 3. In the orientation of FIG. 2, the view is into the exhaust outlet 48. In the orientation of FIG. 6, the view is from the inside looking out the exhaust outlet 48.

Figure 7:
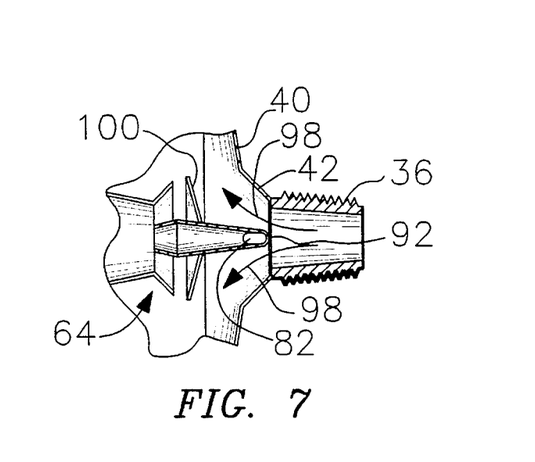
FIG. 7 is a cross-sectional view of a portion of the assembly, showing the air nozzle and venturi, taken on line 7—7 of FIG. 6.

Referring more particularly to the cross-sectional views of FIGS. 6 and 7, the generally cylindrical expansion chamber 32 has an interior volume 50 bounded by a cylindrical outer wall 52, and a pair of expansion chamber end walls 38 and 54, the inner end plate 38 serving as one of the expansion chamber 32 end walls. The expansion chamber end wall 54 is circular, and has a circular central aperture 56. The end wall 54 is secured to the outer wall 52 of the expansion chamber 32 by any suitable means, such as a weld or crimp lock 58. A similar attachment, such as a weld or crimp lock 60, secures the inner end plate 38 by its rim 44 to the expansion chamber 32 outer wall 52.

Mounted centrally and coaxially within the expansion chamber 32 is a series-connected venturi and catalytic converter assembly, generally designated 62. More particularly, the venturi and catalytic converter assembly 62 includes a venturi 64 having an inlet passage 66, a relatively smaller diameter throat 68 within which gas velocity increases to produce lower pressure in a well-known manner, and an outlet portion 70 within a frustroconical transition piece 72. The transition piece 72 is connected to a conventional catalytic converter 74, comprising, for example, a ceramic support structure 76 having longitudinal channels coated with a suitable catalyst, such as platinum, which promotes oxidation of exhaust gas constituents in a well-known manner, within a housing 77.

An outlet end portion 78 of the catalytic converter 74 housing 77 projects through the central aperture 56 in the expansion chamber end wall 54, and the catalytic converter 74 end of the venturi and catalytic converter assembly 62 is secured to the end wall 54 such as by welds (not shown).

It will be appreciated that the threaded connection piece 36 serves as an exhaust gas inlet to the interior volume 50 of the expansion chamber 32, which serves several purposes. One of these purposes of the expansion chamber 32 is reducing the objectionable sound of the periodic exhaust gas surges. Another purpose of the expansion chamber 32, particularly at an early stage following the engine exhaust, is to reduce exhaust gas back pressure on the engine, thus increasing engine efficiency.

Of particular importance in the context of the subject invention, the expansion chamber 32 serves to reduce exhaust gas "surges" to "puffs", producing a relatively more even flow of exhaust gas into the venturi 64. This results in proper venturi operation without exhaust gas backflow out through the intended atmospheric air inlet openings 46 and 46', and also results in sufficient atmospheric air being mixed with the exhaust gas for proper operation of the catalytic converter during all phases of exhaust gas flow. Thus, the venturi 64 inlet passage 66 is within the expansion chamber 32 volume 50, and accordingly is supplied with "puffs" of exhaust gas. The minimum size of the expansion chamber 32 is related to the displacement of an individual cylinder of the engine, such as by a factor of approximately four times. Gas flows within the volume 50 are generally represented by arrows 79.

For introducing atmospheric air into the exhaust gas stream to provide oxygen enrichment for proper operation of the catalytic converter 74, there is an air nozzle 80 having a pair of atmospheric air inlets 82 and 82' in communication with the atmospheric air inlet apertures 46 and 46' in the inner end plate 38, and an air outlet nozzle 84 which projects into the venturi 64 throat 66.

The air nozzle 80 is shown enlarged and in isolation in FIGS. 8–11. Thus, the orientation of the air nozzle 80 in FIG.

Figures 8, 11:
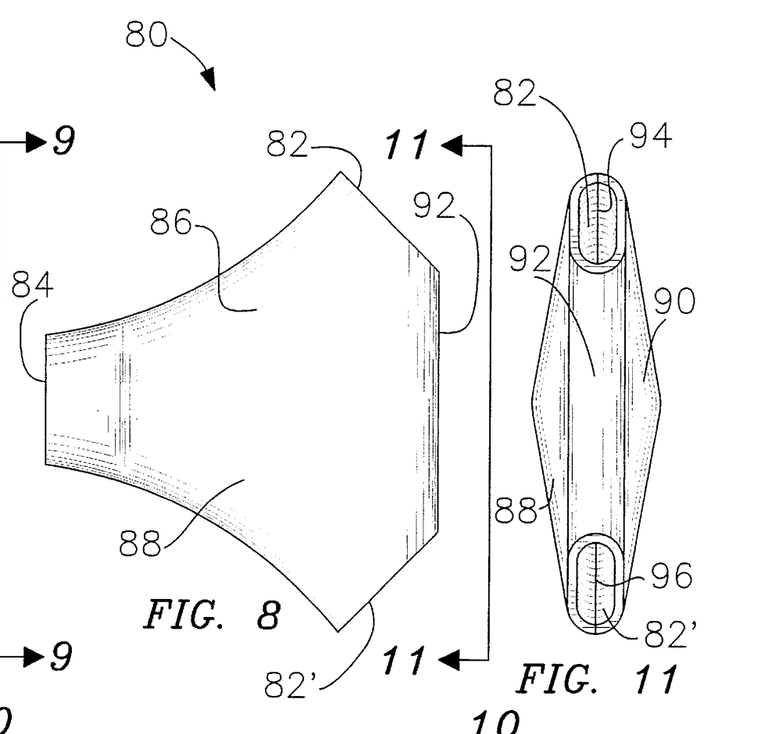
FIG. 8 is an enlarged side elevational view of the air nozzle of FIGS. 6 and 7 in isolation.
FIG. 11 is a rear elevational view of the air nozzle, taken on line 11—11 of FIG. 8.
Figure 9:
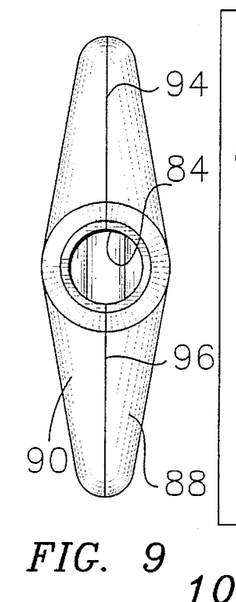
FIG. 9 is a front elevational view of the air nozzle taken on line 9—9 of FIG. 8.
Figure 10:
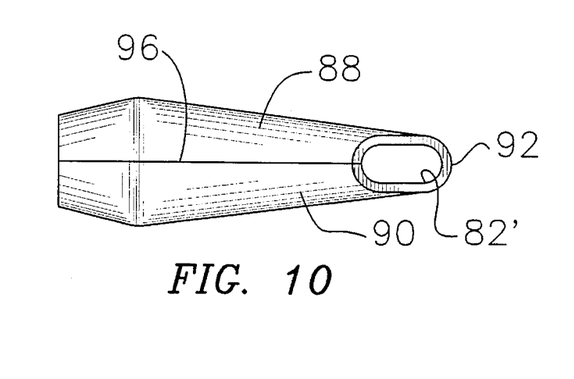
FIG. 10 is a view from below the air nozzle, taken on line 10—10 of FIG. 8.

8 corresponds to the orientation of FIG. 6, although FIG. 8 is in full and not in cross section. The orientation of the air nozzle 80 in FIG. 10 corresponds to that of FIG. 7, although FIG. 10 likewise is in full and not in cross section. In the illustrated embodiment, the air nozzle 80 comprises a hollow body 86 made from a single piece of stamped metal having two halves 88 and 90 folded over to form a continuous and curved leading edge 92, and joined at upper and lower seams 94 and 96. The air nozzle 80 is secured to the inner frustroconical portion 42 of the inner end plate 38, for example by means of welds (not shown), the air inlets 82 and 82' aligning with the apertures 46 and 46' respectively.

The curved leading edge 92 of the air nozzle 80 is positioned within the exhaust gas inlet defined by the connection piece 36. As is best seen in FIG. 7, and as generally indicated by arrows 98, incoming exhaust gas flows on either side of the leading edge 92, and flows freely into the interior volume 50 of the expansion chamber 32.

Figure 12:
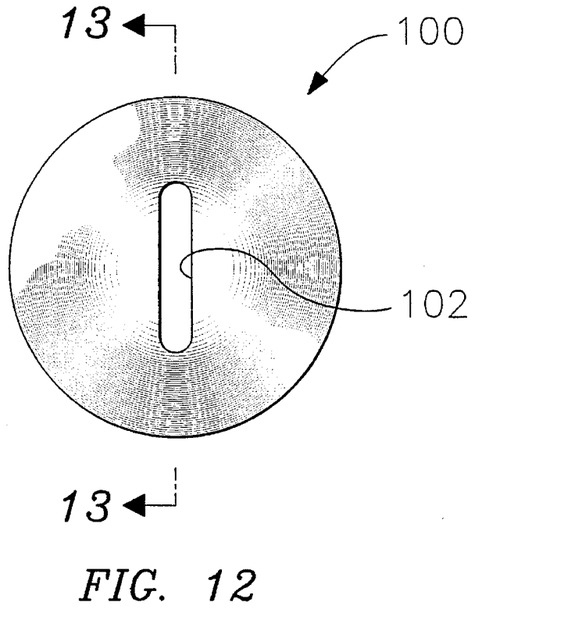
FIG. 12 is an enlarged front view of the baffle plate of the assembly of FIGS. 6 and 7 in isolation.
Figure 13:
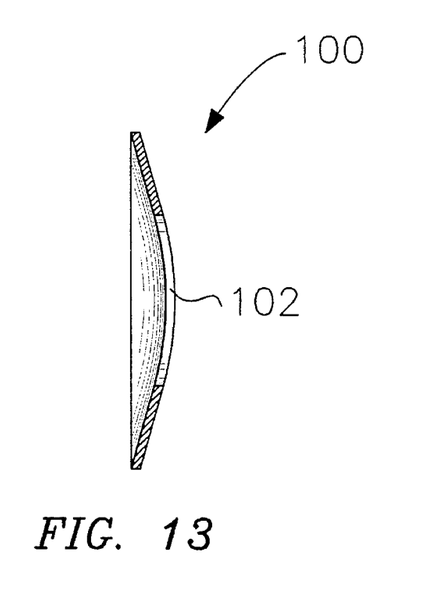
FIG. 13 is a side sectional view of the baffle plate, taken on line 13—13 of FIG. 12.

Preferably, in order to prevent the direct entry or blasting of inlet engine exhaust gas into the venturi 64, which would in effect bypass the expansion chamber volume 50, a generally circular baffle plate 100 is provided, shown in isolation in FIGS. 12 and 13. The baffle plate 100 preferably is slightly dished, with its convex side facing the incoming exhaust gas stream, and has a slotted central aperture 102 which fits over the body 86 of the air nozzle 80, and is secured thereto by suitable means, such as welds (not shown).

The baffle plate 100 thus avoids the effects of gas flow inertia, preventing a high velocity high pressure slug of gas from impinging directly on the venturi 64 entrance 66, which could cause temporary excessive gas flow at the venturi 64 entrance 66.

Figure 14:
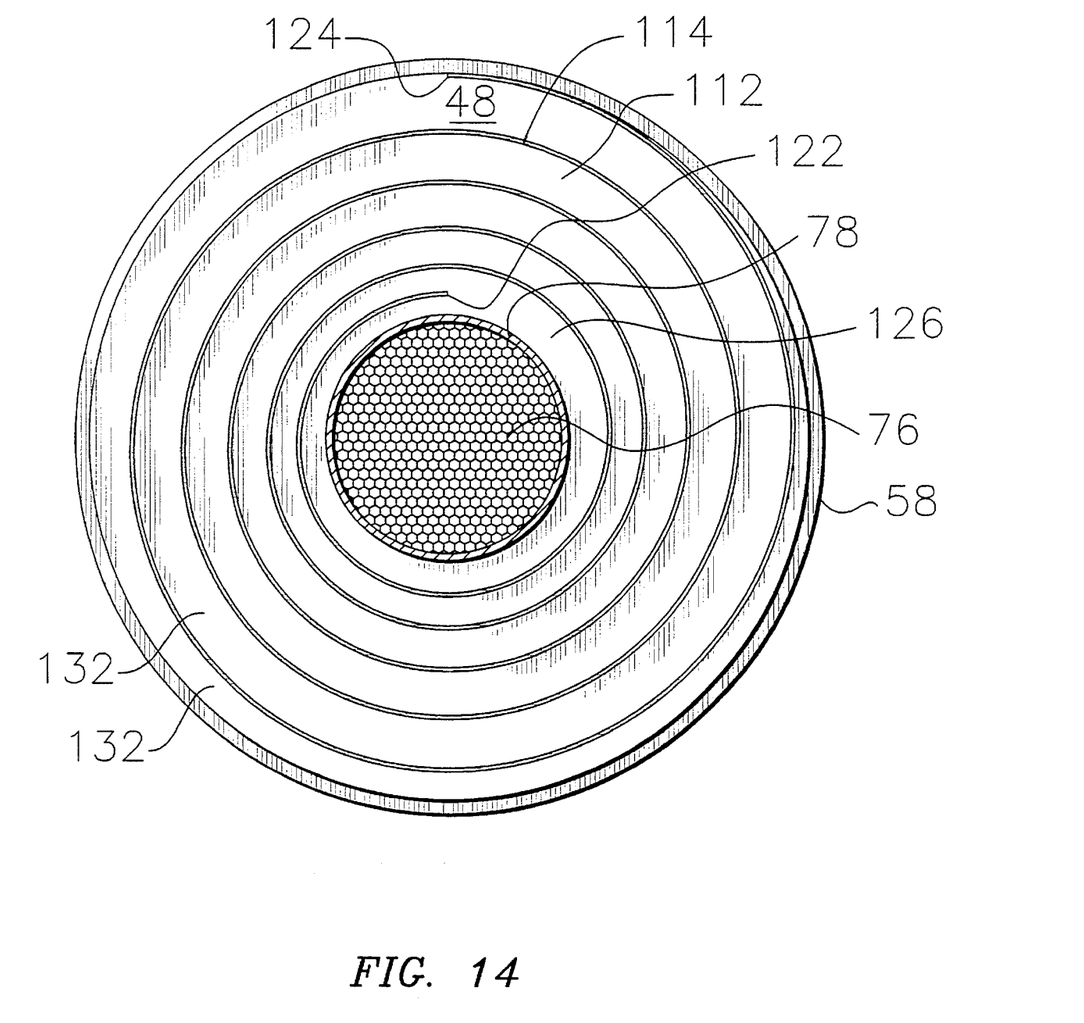
FIG. 14 is a cross-section taken on line 14—14 of FIG. 6, showing the spirally coiled exhaust channel.
Figure 15:
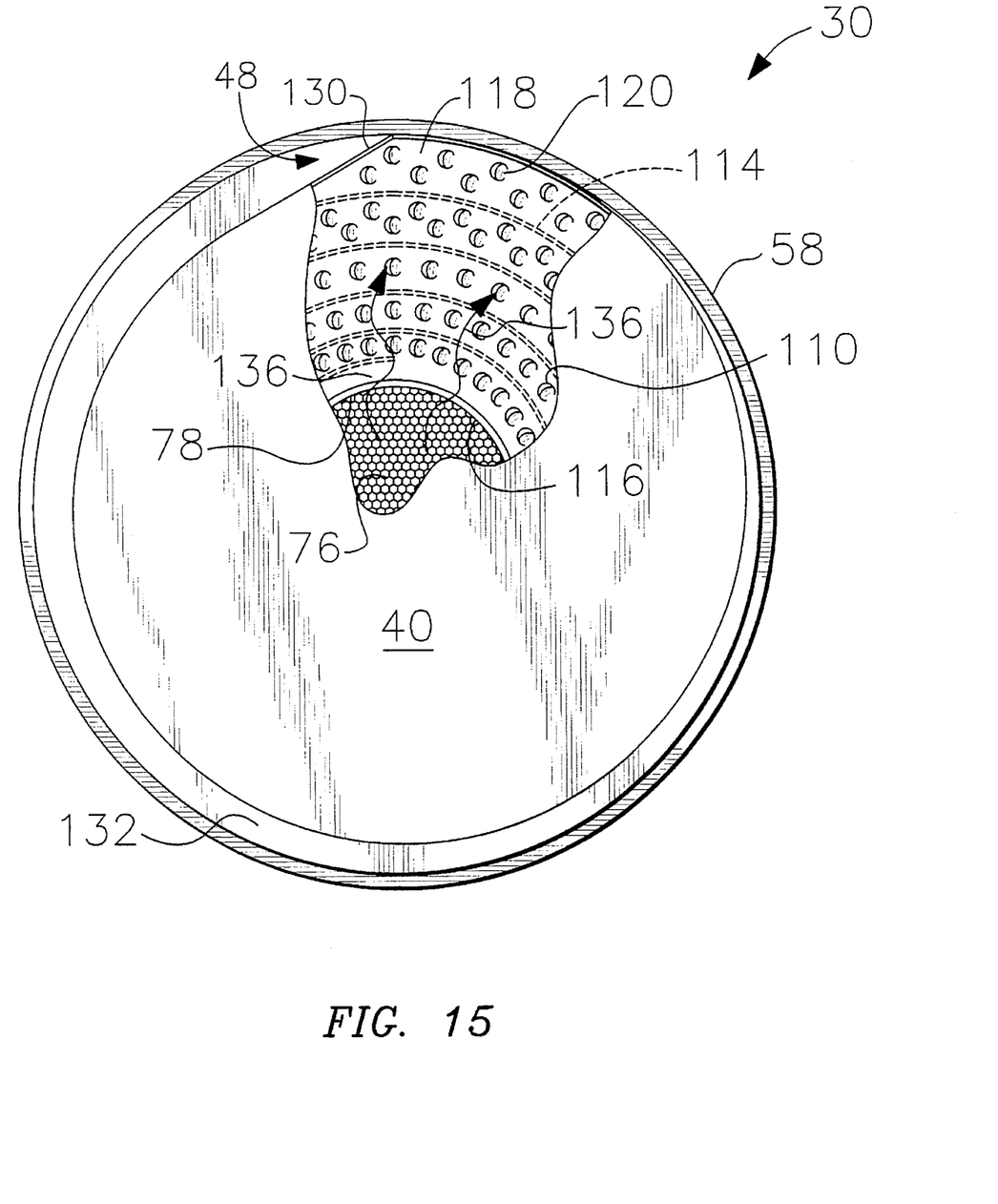
FIG. 15 is an elevational end view of the assembly of FIGS. 1–4 taken on line 15—15 of FIG. 4, with a portion of the outer end wall broken away.

Referring now to FIGS. 14 and 15, in addition to FIG. 6, the phase-spreading spiral muffler 34 receives exhaust gas from the outlet of the catalytic converter 74. The muffler 34 includes a generally cylindrical, relatively short, distribution chamber 110 joined at a seam 111, and a spirally coiled exhaust channel 112, defined by a spiral wall 114. The distribution chamber 110 has a central opening 116 for receiving exhaust gas from the catalytic converter 74.

The outer end wall 40 serves as the outer end wall of the distribution chamber 110, and the distribution chamber 110 additionally has an inner end wall 118 having a plurality of outlet openings 120 described in greater detail hereinbelow with reference to FIGS. 16–19. The inner end wall 118 has a large central aperture 116 corresponding to the opening 116, joined to the terminal end 121 of the outlet end portion 78 of the catalytic converter housing 77. While constructional details may vary, the distribution chamber inner end wall 118 may comprise a stamped metal sheet, having a main portion, and a cylindrical rim which joins the outer spiral wall.

The spiral wall 114 defining the exhaust channel 112 more particularly is sandwiched between the expansion chamber 32 and the distribution chamber 110, advantageously sharing a common wall with each. Thus, the spiral channel 112 shares the wall 54 with the expansion chamber 32, and the wall 118 with the distribution chamber 110. The spiral exhaust channel 112 generally coaxially surrounds the extending portion 78 of the catalytic converter 74, providing a space-efficient arrangement.

The spiral wall 114 has a terminating inner edge 122 (FIG. 14), and a terminating outer edge 124. Correspondingly, the spirally coiled exhaust channel 112 has an inner extremity 126 and an outer extremity 48, the outer extremity 48 corresponding to the muffled exhaust outlet 48 of FIG. 2. Preferably, the inner extremity 126 of the spiral channel 112 is dead-ended and thus effectively closed, as is perhaps best seen in FIG. 14, so that no exhaust gas directly enters the inner extremity 126, other than through the openings 120. In the illustrated construction, the inner coils of the spiral, rather than starting from zero cross-sectional area, start with a minimal spacing that is structurally practical.

Further, rather than a constant radial spacing between the turns of the spiral wall 114, preferably the spacing increases towards the outside, either continuously or in steps. The purpose is to increase the channel 112 cross-sectional area towards the outlet 48 end, thereby to keep gas velocity relatively the same (at a given instant in time) at different points along the channel 112, in view of there being an essentially continuous flow through the openings 110 into the channel 112 along the channel length.

As best seen in the end view of FIG. 15, the outer end plate 40 generally corresponds in configuration to the shape of the spirally coiled exhaust channel 112 as defined by spiral wall 114, with the outer wall of the distribution chamber 102 being a distorted cylinder, generally following the spiral wall 114, with the exception of a terminating wall 130 which merges into the outermost spiral ring. (In FIG. 15, the spiral wall 114 below and actually hidden by the wall 118 is shown in dash lines.) Thus, the terminating end wall 130 is visible in the broken away portion of FIG. 15, but is not present in the cross-section of FIG. 14, which is within the spirally coiled exhaust channel 112. Also visible in FIG. 15 is a portion 132 of the outer surface 132 of the expansion chamber 32 end wall 54, where not covered by the spiral channel 112. Additional portions of the surface 132 are visible in FIG. 14 at the bottom of the channel 112.

As described hereinabove, the phase-spreading spiral muffler thus comprises a relatively long (for example, sixty inches) channel, spirally coiled to confine its length to a small compact area, as well as to facilitate phase mixing. The channel 112 has a sufficient length to neutralize all the higher sound frequency components.

During operation, exhaust gas as represented by arrows 136 flows from the honeycomb structure 76 of the catalytic converter 74 through the opening 116 into the distribution chamber 110, and flows generally radially within the distribution chamber 110. Exhaust gas is then fed or introduced into the channel 112 from the distribution chamber 110 through the openings 120, which are spaced along the exhaust channel 112 at different distances from the muffled exhaust outlet 48. Since the radial distance from the center of the distribution chamber 110 to its outer extremity is relatively small compared to the overall length of the exhaust channel 112, each of the openings 120 may be viewed as being fed by an exhaust "puff" almost simultaneously. Each of the small openings thus passes what may be termed a "sub-puff". Due to the different distances form the exhaust opening 48, the individual "sub-puffs" become individual phase components. These individual phase components of the puff reach the muffled exhaust outlet 48 at different times, resulting in significant phase mixing and cancellation of the resultant sound, producing a highly effective muffler.

Rather than simple punched apertures, it is preferable that the openings 120 include slanted, contoured portions projecting into the exhaust channel 112, directing gas in the downstream direction of channel gas flow, for reducing back pressure. The total cross-sectional area of the slotted openings 120 preferably approximates the cross-sectional area of the muffled exhaust outlet 48.

Figure 16:
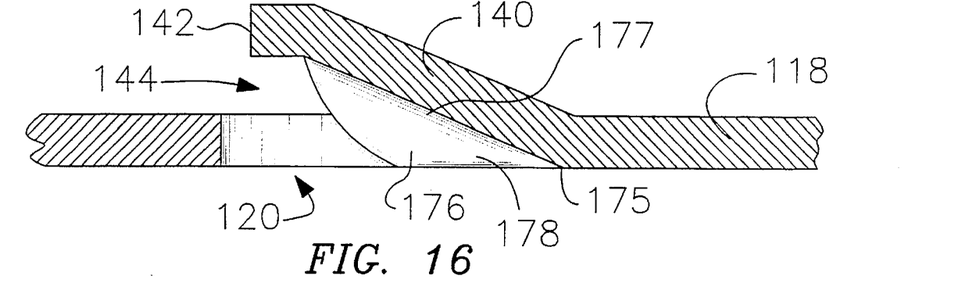
FIG. 16 is an enlarged cross-sectional view of a single one of the openings from the distribution chamber to the spirally coiled exhaust channel.

With reference to FIG. 16, which is a greatly enlarged cross-sectional view of a single opening 120, in a preferred construction, the openings 120 comprise semi-circular apertures partially punched to leave attached flaps 140 of material projecting into the spiral channel 112 and having leading edges 142 facing downstream and defining downstream-facing slots 144.

Figure 17:
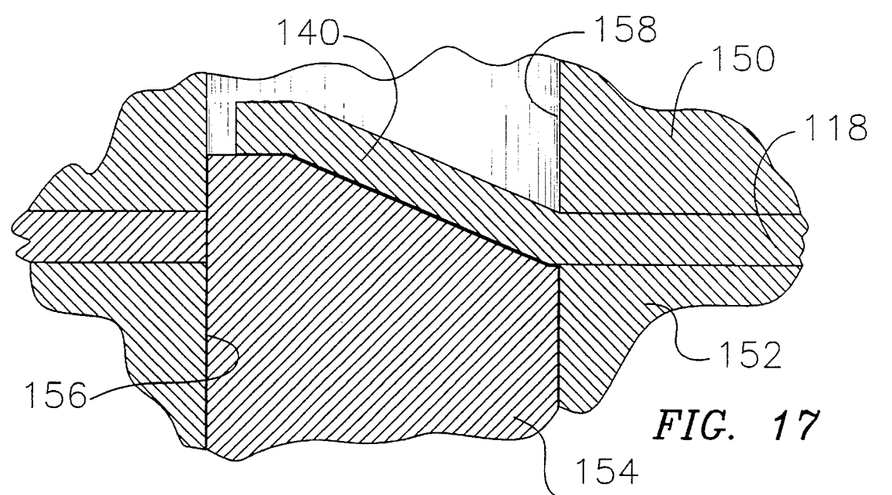
FIG. 17 depicts the opening of FIG. 16 being punched during manufacture.

FIG. 17 more particularly shows the opening 120 of FIG. 16 being formed during manufacture. Thus, in FIG. 17, a suitable die 150, 152 clamps the common wall 118, and a suitable punch 154 is guided through a punch guide aperture 156 and partly into die aperture 158 to form the flap 140.

Figure 18:
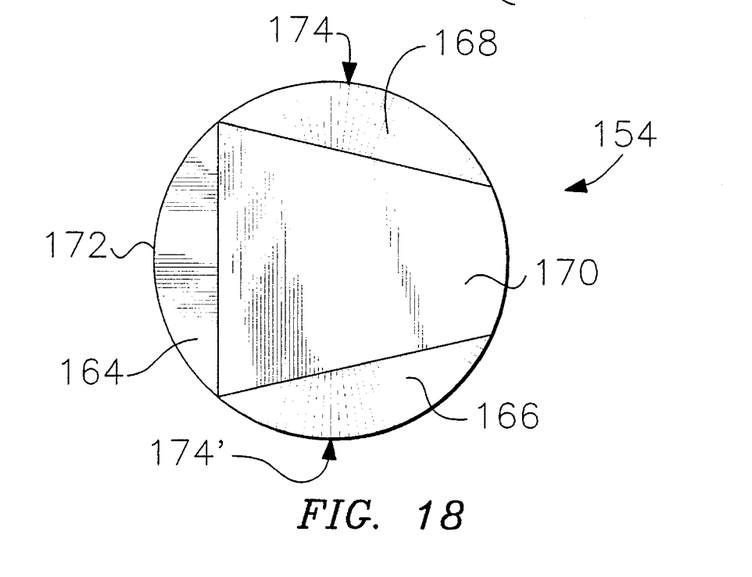
FIG. 18 is a top plan view of the punch of FIG. 17.
Figure 19:
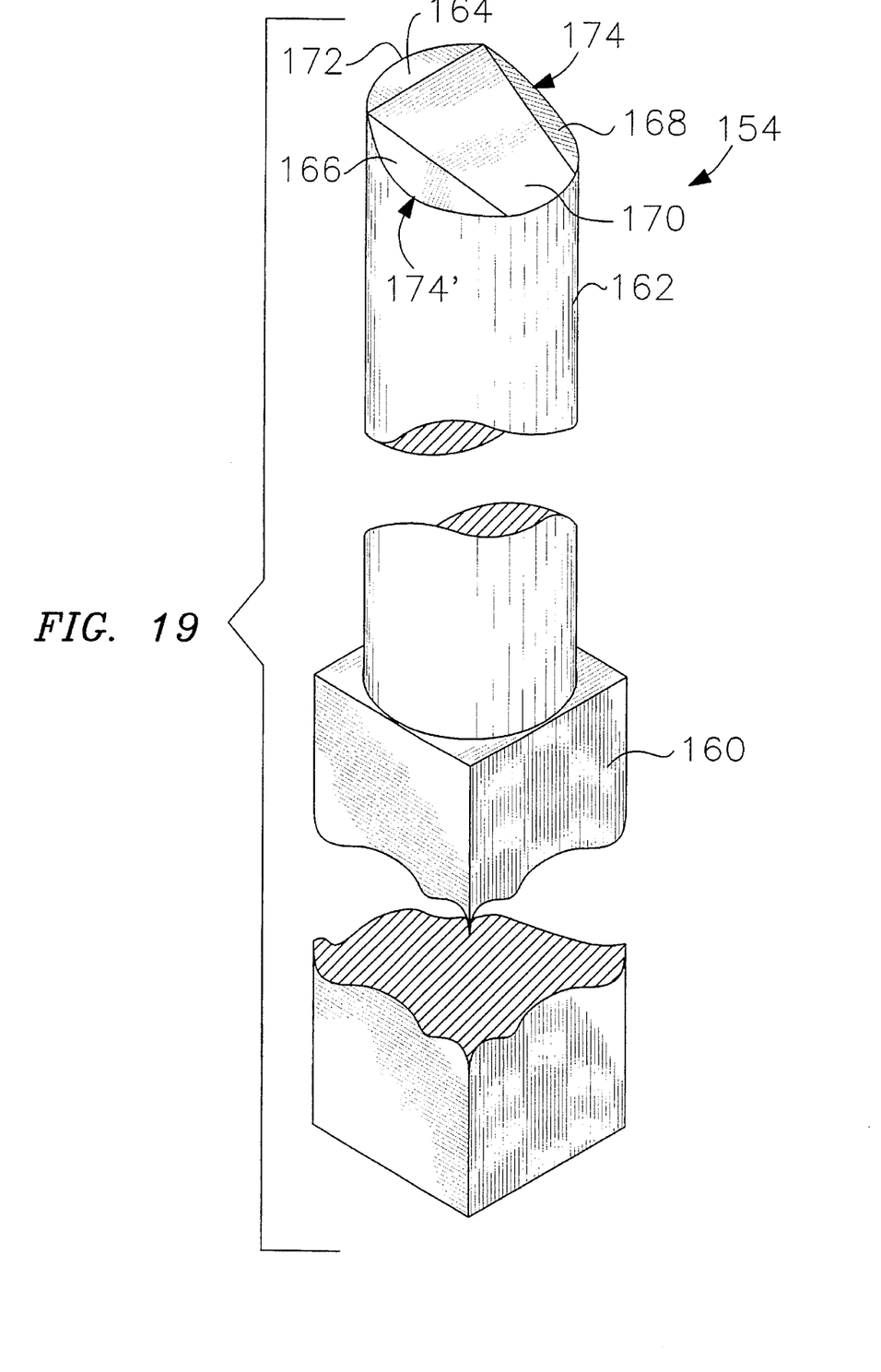
FIG. 19 is a three-dimensional view of the punch of FIG. 17.

FIG. 18 shows a top view of the punch 154, while FIG. 19 shows a three-dimensional view. The punch 154 has a square head 160 to rotationally orient the punch 154 within the punch guide aperture 156, and a tool end portion 162. On the end 162 is a plane surface 164 perpendicular to the longitudinal axis of the punch 154, and there are three additional plane surfaces 166, 168 and 170, angled as indicated. During manufacture, shearing of the sheet metal precursor of the wall 118 occurs starting as punch edge 172 begins to enter die aperture 158, and continues circumferentially around the end portion 162 approximately half way, to diametrically opposed points 174 and 174' along the punch edge. The diameter of the punch 154 for example is 0.180 inch, and the resultant slotted opening 144 is for example 0.030 inch between the wall 118 and leading edge 142.

The resultant flap 140 (FIG. 16) is semi-circular, and is attached to the wall 118 at its base 175, where there is a bend. The flap 140 has a top portion corresponding generally to the punch plane surface 170, and a pair of side portions corresponding generally to the punch plane surfaces 166 and 168. In FIG. 16, the inside surface 176 of one of these side portions is visible, joined to the flap 140 at a concave bend 177, and joined to the wall 118 at a convex bend 178.

This particular form of opening 120 has been shown to result in much less back pressure than simple circular apertures, and, with a suitable, relatively simple die, a complete pattern of apertures 120 can be produced with a single punch press stroke. Moreover, the result is stronger than in the case of a simple rectangular flap joined only at the base 175.

Another consideration is the spacing of the openings 120. Within the innermost turns of the spiral, exhaust gas tends to flow at a relatively slower velocity than at the outer turns. Accordingly the slotted openings 120 within the channel 112 should be spaced relatively closer together at the inner turns. Also, for fabricational purposes, it is preferable to space the slotted openings 120 at a constant angular interval, as is generally apparent from FIG. 15. These two factors work together in that the slotted openings 120 at shorter radial distances are generally closer together with reference to distance along the channel 112, rather than being uniformly spaced along the channel length from the inner to the outer extremity.

Figure 20:
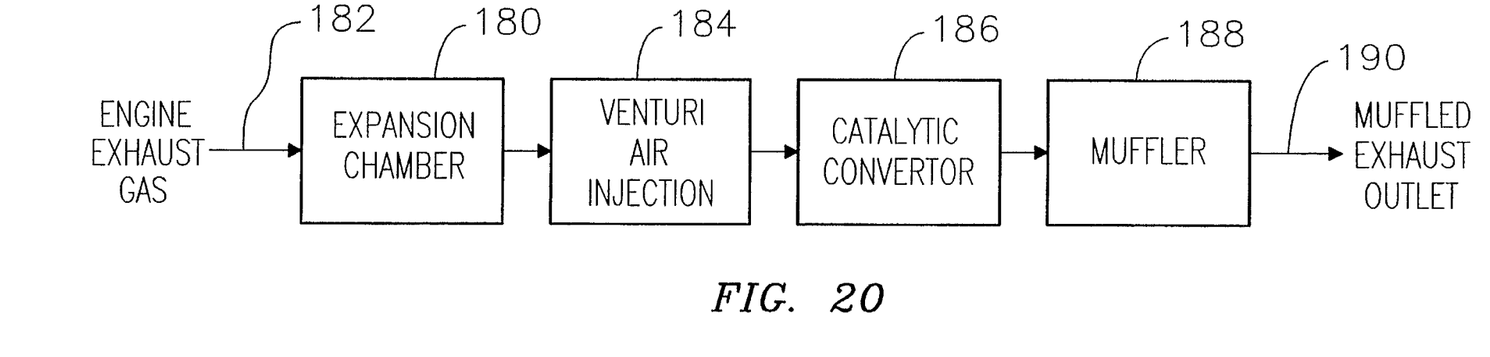
FIG. 20 is a generalized block diagram representing one form of assembly in accordance with the invention.

With reference now to FIG. 20, it will be appreciated that the catalytic converter and phase-spreading muffler assembly described hereinabove with reference to FIGS. 1–16 comprises four series-connected elements, an expansion chamber 180 having an inlet 182 for engine exhaust gas, a venturi 184 downstream of the expansion chamber 180 for drawing in and mixing atmospheric air with the exhaust gas stream, followed by a catalytic converter 186 and a muffler 188, which connects to a muffled exhaust outlet 190.

Figure 21:
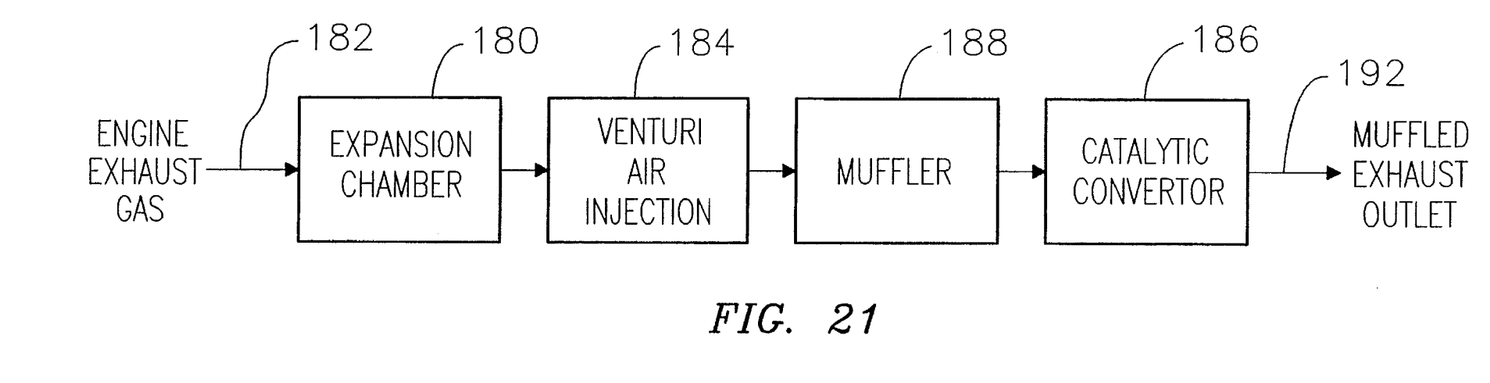
FIG. 21 is a generalized block diagram representing another form of assembly in accordance with the invention.

However, as depicted in FIG. 21, in accordance with the invention the order of elements may be changed. Thus, in FIG. 21, the catalytic converter 186 is downstream of the muffler 188, and a muffled exhaust outlet 192 is connected to the catalytic converter 186.

Figure 22:
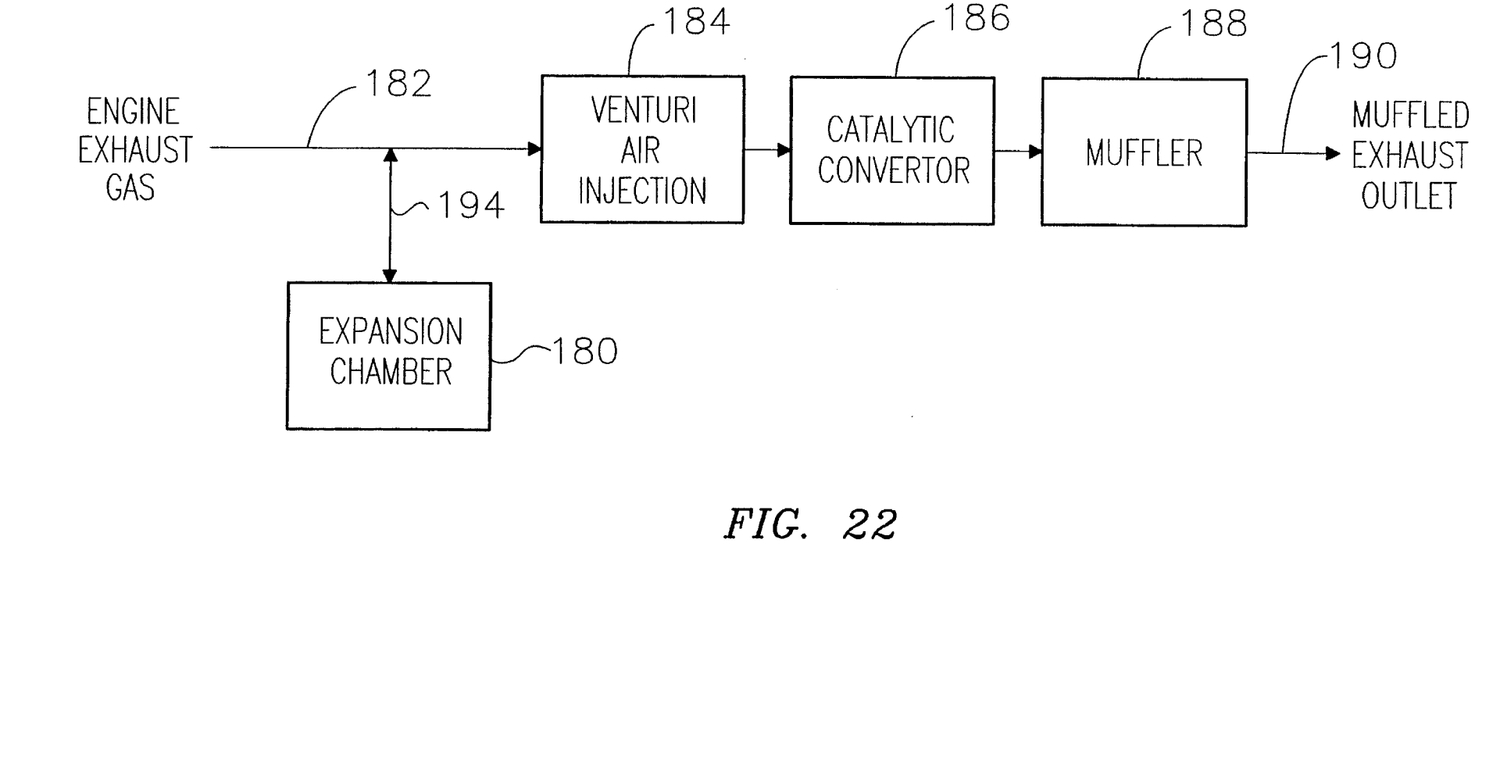
FIG. 22 is a generalized block diagram representing yet another form of assembly in accordance with the invention.

FIG. 22 depicts another arrangement where the expansion chamber 180, rather than being physically in series, is connected between the inlet 182 and venturi 184 by a side channel 194. In order to be effective, the side channel 194 should have a cross-sectional area at least approximately the same as the cross-sectional area of the main channel between the inlet 182 and venturi 184.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A device for treating exhaust gas from an engine which produces exhaust gas in periodic surges, said device comprising:

an exhaust gas inlet;

an expansion chamber for reducing periodic exhaust gas surges, said expansion chamber having an expansion chamber inlet connected to said exhaust gas inlet and an expansion chamber outlet;

a venturi downstream of said expansion chamber outlet for drawing in and mixing atmospheric air with exhaust gas;

a catalytic converter downstream of said venturi for oxidizing exhaust gas constituents; and a phase-spreading muffler downstream of said catalytic converter, said muffler including:

a spirally coiled exhaust channel formed about a central axis, said exhaust channel having an inner extremity and an outer extremity, and said exhaust channel having a muffled exhaust outlet at said outer extremity, a distribution chamber adjacent said exhaust channel sharing a common wall with said exhaust channel, said common wall being perpendicular to the central axis, and said distribution chamber having an inlet for receiving exhaust gas from said catalytic converter, and said common wall having a plurality of openings spaced along said exhaust channel at different distances from said muffled exhaust outlet for introducing exhaust gas from said distribution chamber into said exhaust channel.

2. The device of claim 1, wherein said spirally coiled exhaust channel is dead-ended at said inner extremity.

3. The device of claim 1, wherein said openings, include contoured portions projecting into said exhaust channel and face in a downstream direction towards said muffled exhaust gas outlet.

4. The device of claim 3, wherein said openings comprise apertures that are partially punched to leave an attached flap of material, said flaps having leading edges facing downstream within said exhaust channel and defining downstream-facing slots.

5. The device of claim 4, wherein said flaps are semi-circular.

6. A phase-spreading muffler for deadening the sound of an engine which produces exhaust gas in periodic surges, said muffler comprising:

a spirally coiled exhaust channel formed about a central axis, said exhaust channel having an inner extremity and an outer extremity, and said exhaust channel having a muffled exhaust outlet at said outer extremity;

a distribution chamber adjacent said exhaust channel sharing a common wall with said exhaust channel, said common wall being perpendicular to the central axis, and said distribution chamber having an inlet for receiving exhaust gas from the engine; and said common wall having a plurality of openings spaced along said exhaust channel at different distances from said muffled exhaust outlet for introducing exhaust gas from said distribution chamber into said exhaust channel.

7. The muffler of claim 6, wherein said spirally coiled exhaust channel is dead-ended at said inner extremity.

8. A phase-spreading muffler for deadening the sound of an engine which produces exhaust gas in periodic surges, said muffler comprising:

a spirally coiled exhaust channel formed about a central axis, said exhaust channel having an inner extremity and an outer extremity, said exhaust channel having a muffled exhaust outlet at said outer extremity, and said exhaust channel being dead-ended at said inner extremity;

a distribution chamber adjacent said exhaust channel sharing a common wall with said exhaust channel, said common wall being perpendicular to the central axis, and said distribution chamber having an inlet for receiving exhaust gas from the engine; and said common wall having a plurality of openings spaced along said exhaust channel at different distances from said muffled exhaust outlet for introducing exhaust gas from said distribution chamber into said exhaust channel, said openings including contoured portions projecting into said exhaust channel and facing in a downstream direction towards said muffled exhaust gas outlet.

9. The muffler of claim 8, wherein said openings comprise apertures that are partially punched to leave an attached flap of material, said flaps having leading edges facing downstream within said exhaust channel and defining downstream-facing slots.

10. The muffler of claim 9, wherein said flaps are semicircular.

11. A device for treating exhaust gas from an engine which produces exhaust gas in periodic surges, said device comprising:

a generally cylindrical expansion chamber having a pair of expansion chamber end walls;

an exhaust gas inlet in one of said expansion chamber end walls;

a series-connected venturi and catalytic converter assembly mounted centrally and coaxially within said expansion chamber, said venturi having an inlet for receiving exhaust gas from within said expansion chamber, and said catalytic converter assembly projecting through a central opening in the other of said expansion chamber end walls;

an air nozzle projecting into said venturi for drawing in atmospheric air for mixing with exhaust gas within said venturi; and a phase-spreading spiral muffler adjacent said other of said expansion chamber end walls, said muffler having an inlet for receiving exhaust gas from said catalytic converter, and said muffler including elements arranged generally coaxially around an extending portion of said catalytic converter.

12. The device of claim 11, wherein said muffler comprises:

a generally cylindrical distribution chamber having a closed distribution chamber outer end wall and a distribution chamber inner end wall with an opening connected for receiving gas from said catalytic converter;

a spirally coiled exhaust channel having an inner extremity and an outer extremity and sandwiched between said expansion chamber and said distribution chamber, said exhaust channel having a muffled exhaust outlet at said outer extremity, said exhaust channel generally coaxially surrounding said extending portion of said catalytic converter about a central axis, said exhaust channel sharing said other of said expansion chamber end walls as one common wall perpendicular to the central axis, and said exhaust channel sharing said distribution chamber inner end wall as another common wall perpendicular to the central axis; and said another common wall having a plurality of openings spaced along said exhaust channel at different distances from said muffled exhaust outlet for introducing exhaust gas from said distribution chamber into said exhaust channel.

13. The device of claim 12, wherein said spirally coiled exhaust channel is dead-ended at said inner extremity.

14. The device of claim 11, wherein:

said exhaust gas inlet is centered on said one of said expansion chamber end walls in line with said venturi; and which device further comprises a baffle plate for blocking the direct entry of exhaust gas from said exhaust gas inlet into said venturi.

15. The device of claim 11, wherein said air nozzle has a pair of inlets connected to apertures in said one of said expansion chamber end walls, and an outlet within said venturi.

16. The device of claim 12, wherein:

said exhaust gas inlet is centered on said one of said expansion chamber end walls in line with said venturi; wherein said air nozzle has a pair of inlets connected to apertures in said one of said expansion chamber end walls and an outlet coaxially centered within said venturi; and which device further comprises a baffle plate for blocking the direct entry of exhaust gas from said exhaust gas inlet into said venturi.

* * * * *